(No Model.)
G. COULON.
LOCKING BOLT.
No. 352,398. Patented Nov. 9, 1886.
Fig.1. Fig.2.
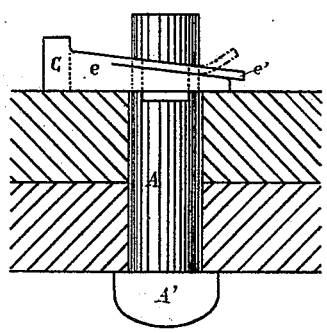 
Fig.3.
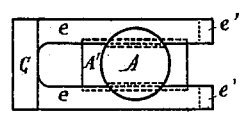
Witnesses.
J. R. Harding
C. M. Werle
Inventor.
Georges Coulon
per J. E. Duff
Attorney.
N. PETERS, Photo-Lithographer, Washington, D. C.

UNITED STATES PATENT OFFICE.

GEORGES COULON, OF PARIS, FRANCE.

LOCKING-BOLT.

SPECIFICATION forming part of Letters Patent No. 352,398, dated November 9, 1886.

Application filed April 20, 1886. Serial No. 199,506. (No model.) Patented in France October 8, 1885, No. 171,553.

*To all whom it may concern:*

Be it known that I, GEORGES COULON, of Paris, France, have invented certain new and useful Improvements in or relating to Bolts or the Like, of which the following is a specification.

This invention relates to improvements in locking bolts or pins without screw-thread or nut, destined to replace advantageously the ordinary bolt in most of its applications—for instance, to join metal or wooden parts, to fasten the fish-plates on the rails, or to join metallic sleepers.

In the accompanying drawings, Figure 1 represents a bolt in position to join two parts and provided with its forked key C. Fig. 2 is a side elevation of the bolt. Fig. 3 represents a plan of the bolt and the key.

The cylindrical, rectangular, or other conveniently-shaped bolt or pin A has a head, A', of any suitable form, and is usually of equal dimension in the whole length of its shaft. Near the end this shaft is provided with two parallel grooves or recesses, B and B', the edges of which nearest the end of the shaft are tapering. The grooves are designed to receive the arms e of a forked key, C, and as these arms are tapered to the same angle as the grooves they will always fit properly. The arms e of the forked key C are split for some distance, so as to form two tongues, e', which are slightly longer than the arms e, and it follows from this arrangement that when the bolt is put into its place and the key fitted into the grooves and driven home the tongues e' need only be lifted or bent by some instrument to hold the bolt firmly in its position. The key can be firmly embedded in the grooves by striking it on its head, and the bent tongues e', resting against the body of the bolt itself, effectually prevent the bolt from moving.

If the bolt is to be withdrawn, the bent tongues e' are hammered down again into their original position, and then the key and the bolt driven out.

By the aid of this bolt, pieces or parts can be rapidly connected or disconnected. It is especially applicable to the joining of fish-plates and rails, the more so as there is no rusting of the screw-thread, which is so often the cause of the breaking of the bolt, and therefore it can be used for an almost unlimited period, and is in consequence economical in its use.

I claim—

1. The improved wedge pin or key herein described, consisting of the solid head, the bifurcated body, forming wedge-shaped prongs or arms e, and the tongues e', formed integral with and upon the side of the arms, and of a slightly greater length, as set forth.

2. In combination, the bolt A, having inclined grooves or recesses B B', and the pin or key having a solid head and a bifurcated body, forming wedge-shaped prongs or arms e, with tongues e' formed integral therewith and upon the sides thereof, and adapted to fit the recesses B B' of the bolt, as and for the purpose set forth.

In witness whereof I have hereunto signed my name in the presence of two subscribing witnesses.

GEORGES COULON.

Witnesses:
ROBT. M. HOOPER,
ACHELLE MARILLIER.